United States Patent

Rouchon et al.

[11] Patent Number: 6,147,710
[45] Date of Patent: Nov. 14, 2000

[54] METHOD OF CORRECTING FAULTS IN AN OPTO-MECHANICAL SCANNING CAMERA AND A CAMERA USING THE METHOD

[75] Inventors: Jean-Marc Rouchon, Orsay; Jean-Louis Ricci, Paris; Bernard Grancoin, Chevilly Larue; Sylvie Vintezou; Gilles Dairon, both of Issy les Moulineaux; Michel Jouan, Paris, all of France

[73] Assignee: Thomson-CSF, Puteaux, France

[21] Appl. No.: 08/274,141

[22] Filed: Jul. 14, 1994

Related U.S. Application Data

[63] Continuation of application No. 07/973,985, Nov. 9, 1992, abandoned.

[30] Foreign Application Priority Data

Nov. 15, 1991 [FR] France ................................ 91 14102

[51] Int. Cl.[7] ................................................ H04N 5/232
[52] U.S. Cl. .......................... 348/345; 348/216; 250/332
[58] Field of Search .................... 348/345, 349, 348/335, 216, 164; 250/332, 334; H04N 5/225, 5/232

[56] References Cited

U.S. PATENT DOCUMENTS

| | | |
|---|---|---|
| 4,155,096 | 5/1979 | Thomas et al. . |
| 4,298,887 | 11/1981 | Rode ........................................ 358/113 |
| 4,698,685 | 10/1987 | Beaverson .......................... 358/213.15 |
| 5,134,474 | 7/1992 | Hanafusa et al. . |
| 5,231,443 | 7/1993 | Subbarao . |

FOREIGN PATENT DOCUMENTS 289265  11/1988  European Pat. Off. ......... H04N 5/33

*Primary Examiner*—Tuan Ho
*Attorney, Agent, or Firm*—Oblon, Spivak, McClelland, Maier & Neustadt, P.C.

[57] ABSTRACT

An image output by a camera can contain a fault such that the signal output by the camera is not constant for a uniform background. To correct this fault, the method involves memorizing, as a correction image, a destructured image of the scene to be observed; this destructured image is generated by calculating the means of the signals obtained when the selected scene is observed while the camera settings are simultaneously modified inconsistently; the correction image is then subtracted from the image formed by the signals output by the detector during real observation of the scene selected with correct camera settings. Application to all scanning cameras.

12 Claims, 2 Drawing Sheets

METHOD OF CORRECTING FAULTS IN AN OPTO-MECHANICAL SCANNING CAMERA AND A CAMERA USING THE METHOD

This application is a Continuation Division of application Ser. No. 07/973,985, filed on Nov. 9, 1992, now abandoned.

BACKGROUND OF THE INVENTION

This invention is a method of correcting faults in the image produced by the detector in a detector camera and applies, in particular but not exclusively, to thermal cameras with an opto-mechanical scanning system.

When a scene is observed using a camera with series, parallel or series-parallel scanning, the image formed by the detector signals contains faults. For example, a uniform background observed by a camera does not give an uniform image at the camera output but an image whose signal may vary along a line and from one line to another and which can change, generally periodically, from the top to the bottom of the image.

To correct these faults, it has been proposed to subtract a memorized image, obtained by filming a uniform background, from the image of the scene formed by the detector signals.

The results obtained by this type of process are not always satisfactory. When looking for the reasons, inventors, supported by experimental evidence, have shown that the amplitude of the faults depends on the difference between the camera temperature and that of the scene observed. However, the uniform background used to produce the correction image memorized is not generally at the same temperature as the scene being observed by the detector; this is why the correction is generally unsatisfactory.

SUMMARY OF THE INVENTION

This invention aims to avoid this drawback.

In many cases, the camera operator cannot easily determine the temperature of the scene being observed, particularly due to the greater or lesser distance between the camera and the scene observed. This is why, to achieve the aim mentioned above, it is proposed that the correction image memorized be obtained not from a background placed in front of the camera but by destructuring a view of the scene to be observed.

According to this invention, there is provided a method of correcting, in a camera with a detector and opto-mechanical scanning, faults in the digital image of even- and odd-parity frames where the frames consist of fixed points of the image arranged in lines and represented by digital values obtained by converting analog values output by the detector, this method consisting of aiming the camera at a scene, destructuring the image of the scene, for a given lapse of time, by making inconsistent changes to the camera settings, acquiring, during this given lapse of time, m, where m is a positive integer, frames with a same parity to calculate a mean frame in which each point has almost the mean value of the digital values of this considered point in the m frames, memorizing a correction frame in which the value of each point corresponds to the value of each point in the mean frame to within a given constant value, correctly adjusting the camera settings to observe the scene, subtracting, for each point, the memorized value of the point from the digital value of the same point in a frame obtained with the correct settings.

BRIEF DESCRIPTION OF THE DRAWINGS

The invention will be better understood and other advantages will become clear upon reading the following description, referring to the appended figures of which.

DETAILED DESCRIPTION OF THE PREFERRED EMBODIMENTS

Figure 1:
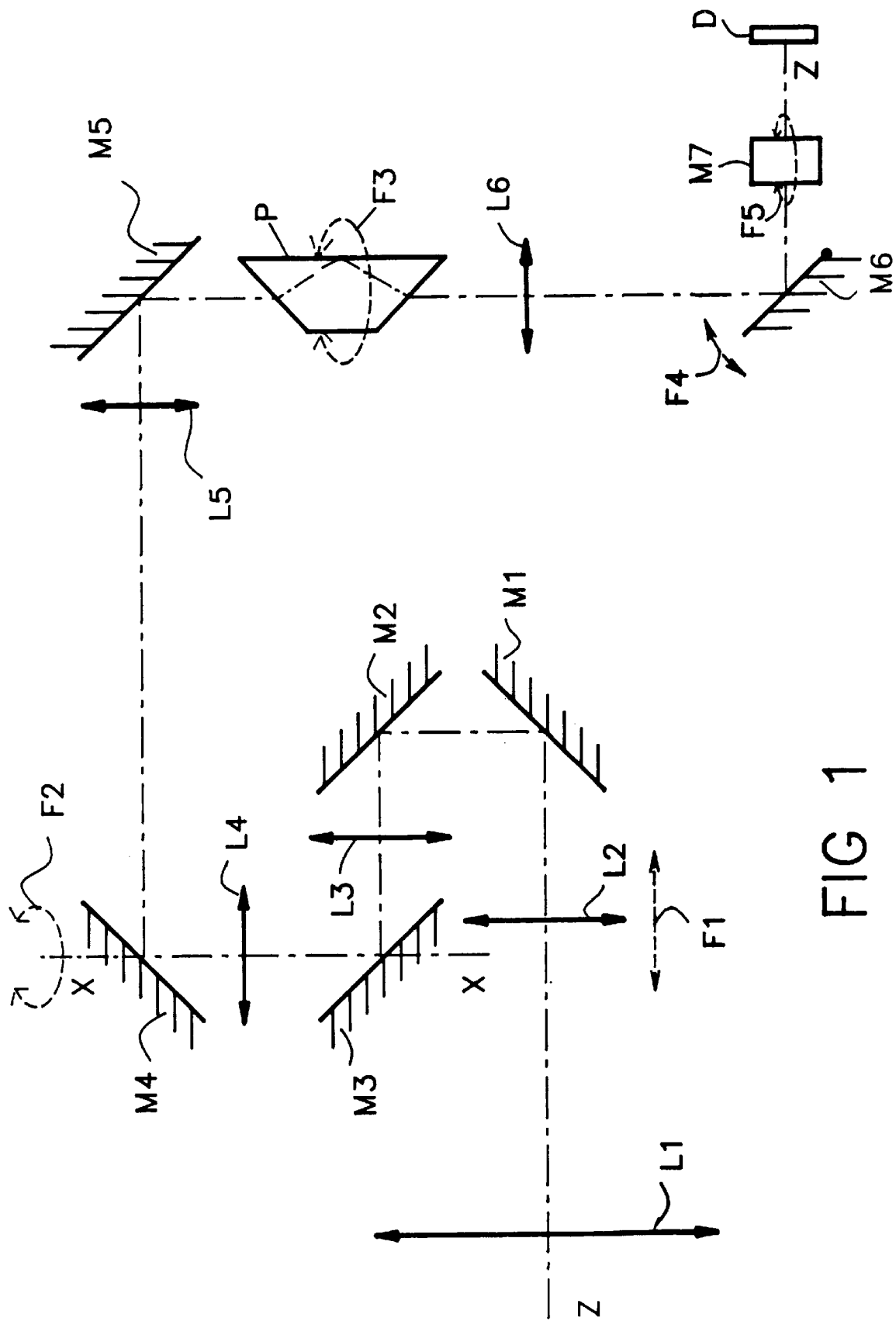
FIG. 1 is a schematic diagram of a camera implementing the method according to the invention.

FIG. 1 is a simplified diagram of a camera which, in the embodiment used as an example for this description, is a thermal camera operating in the 8–12 micron range with a detector D consisting of an array of 4×11 infrared sensors. In the diagram according to FIG. 1 the lenses or groups of lenses are represented, for simplicity, by the symbol for a convergent lens; consequently, six convergent lenses L1 to L6 are shown. These six lenses, in conjunction with seven mirrors M1 to M7 and a derotation prism P define optical paths such as the path ZZ between the scene in the field of the camera and detector D.

The camera contains mechanical systems, known to the prior art and not represented, to:

- modify the camera focus by a linear movement of the lens L2; this movement is symbolized by a double-ended arrow F1 in FIG. 1,
- change the elevation of the camera line of sight by rotation about an axis XX; this movement, symbolized by double-ended arrow F2 in FIG. 1, rotates the assembly of lenses L1 to L3 and mirrors M1 to M3 about axis XX,
- rotate the image obtained by the camera by means of the derotating prism P whose purpose is, for example when the camera is mounted in an aircraft, to display the image to the pilot so that the horizon line is always parallel to the bottom of the image regardless of the aircraft position; this movement is symbolized by a double-ended arrow F3 in FIG. 1,
- scan the image field; a mirror M6 provides the frame scan and another mirror M7, which is a facette mirror, the line scan.

To generate the signals to correct the image output by the camera, in the method described below, a uniform grey background is not first placed in front of the camera, as is destructured by inconsistently changing the camera settings. This process is designed to obtain correction signals which depend on the difference in temperature between the scene observed and the camera and to ensure that these signals are modulated solely by the faults to be corrected and not by the scene observed. To destructure the image, the following operations are performed simultaneously, within a time slightly less than 2 seconds:

- continuous movement of the lens L2 so that the image is not sharp,
- rotation about an axis XX to move the line of sight downwards from 0 degree elevation to −45 degrees elevation,
- rotation of the image by means of the derotating prism P.

The camera outputs odd- and even-parity frames consisting of signals corresponding to points at fixed, well-defined coordinates in the image. However, experience shows that faults to be corrected vary relatively slowly along a line or a column. It is for this reason that, in this example of an embodiment, to simplify obtaining the correction signals, the signals are only determined directly for one set of frames of one of the two given parities, in this example, even-parity frames, and only for one point of every n in a line, where n is an integer greater than 1; in this example, n is 4.

These signals are determined directly, during the destructuring of the image, using m frames of the same parity where m is 48 in the example described; the correction signals for the given points (1 of n per line) in frames of the given parity (even-parity in this example) are obtained:

by summing, for each given point in the m frames of given parity, the m signals for this given point, by dividing the results obtained, for each given point, by the number m of signals added to obtain a mean signal for each given point, by determining the minimum luminance level among all these mean signals and subtracting this level from each mean signal.

At this stage in the method, a correction frame, with a given parity, is obtained but is incomplete since it only contains one point for every n in a line. Advantage is taken of the fact that faults along a line vary slowly and the correction signal for a point missing from the correction frame of the given parity is obtained by interpolating between the correction signals for the two points already processed closest to the missing point on the line. Equally, benefitting from the fact that faults vary only slowly along a column, in the example described, the correction frame with the opposite parity to the given parity is considered identical to the correction frame with the given parity.

It is then possible to begin correcting the image observed by subtracting, from each point in the image, the correction signal determined previously for the same point. It can happen, during correction, that the level of the correction signal is greater than that of the signal to be corrected; in this case, to avoid reversed luminance, the corrected signal level is assumed to be zero.

Figure 2:
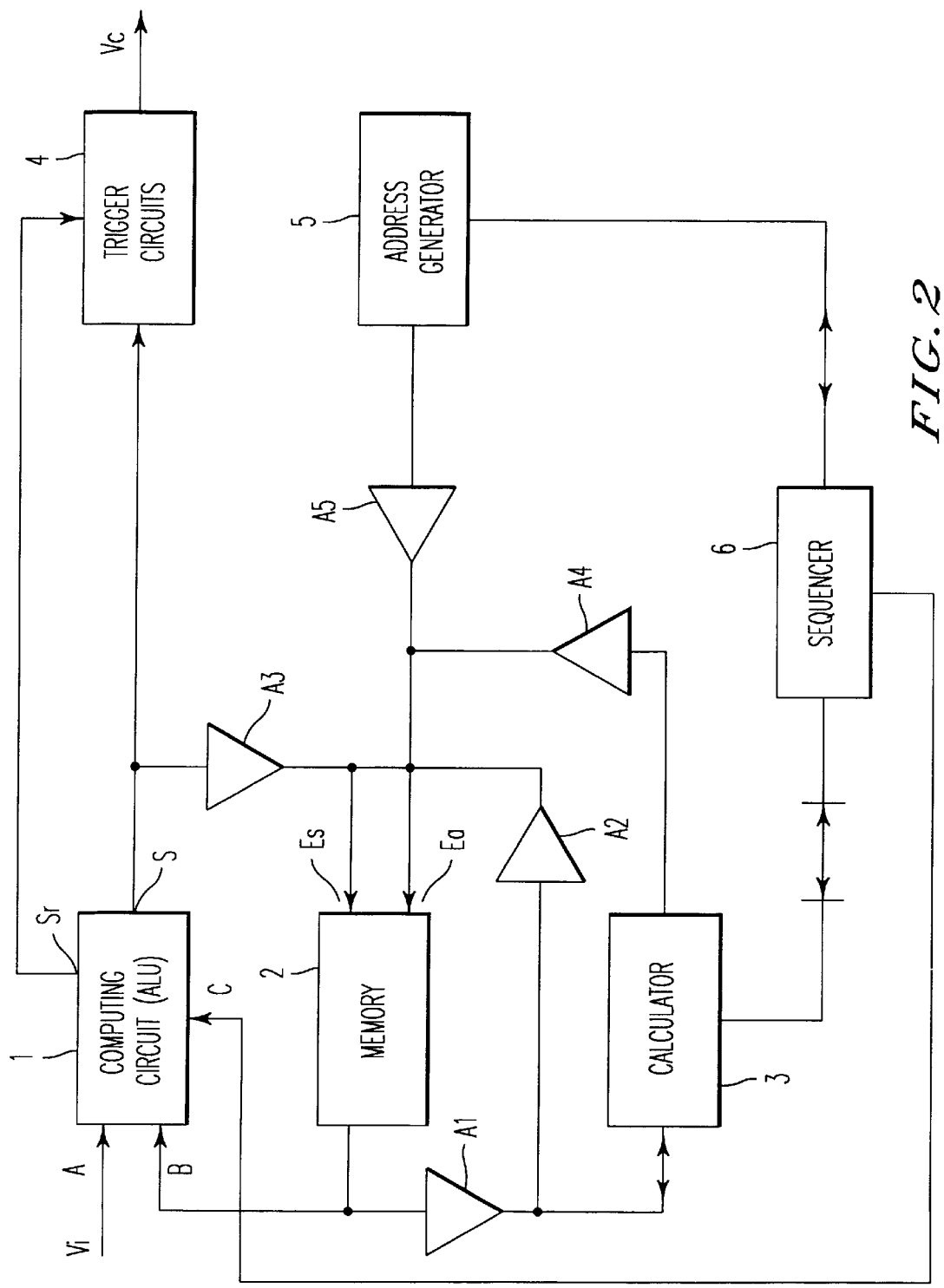
FIG. 2 is an electrical diagram of a circuit to implement the method according to the invention in a camera as shown in FIG. 1.

FIG. 2 is a diagram of electronic circuits capable of implementing the correction method described above. This diagram does not show precise synchronization devices, which are known to the prior art, to make the diagram clearer and to simplify the description. Moreover, the diagram is identical to that used to implement the fault correction method known to the prior art, in which the correction signals are obtained by placing a mask, comprising a uniform grey background, in front of the camera; the differences lie in the processing applied to obtain the image correction signals.

FIG. 2 shows a computing unit 1, generally known as an "arithmetic and logic unit" (or by its acronym ALU). The circuit 1 has two inputs A and B. The video signal Vi, obtained during the frame scan, is applied to its input A; the signal Vi is a digital signal output by an analog-digital converter, not represented, processing the signals output by the detector D shown in FIG. 1. It should be noted that, in FIG. 2, all the connections are represented by single lines to simplify the diagram although several of them are, in fact, multi-wire links; for example, the links which terminate at circuit 1 inputs A and B are designed to carry 8 bits in parallel in the example described.

The circuit 1 has a control input C to control it either as an adder or a subtracter, i.e. to make it calculate either the sum of or the difference between (these two values being denoted A+B and A−B respectively) the signals designated A and B which are present, at a given instant in time, on its inputs A and B. The circuit 1 has a main output S which carries the absolute value of A+B or A−B, depending on the operating mode selected, and a sign output Sr which gives the algebraic sign of the result of the operation executed by the circuit 1; since, due to the construction of the camera, A and B are always positive, the sign of the results of the operation executed by the circuit 1 is always positive except when B is larger than A in the A−B operation.

Trigger circuits 4 are connected in parallel and have their signal inputs connected, by a multi-wire link, to output S from the circuit 1 and a common reset input connected to the circuit 1 sign output Sr; they output corrected signal Vc over a multi-wire link.

An image memory 2 with a signal input Es and an addressing input Ea, has one output connected to input B of the circuit 1 and to the input of an amplifier A1.

A calculator 3 has one output connected, via an amplifier A4, to the addressing input Ea of the memory 2 and two 2-way ports, the first of which is connected to the amplifier A1 output and the amplifier A2 input to respectively receive and transmit image signals from/to memory 2.

A sequencer 6 has a first 2-way port connected to the second 2-way port of calculator 3 and a second 2-way port and an output connected to input C which controls whether the computing circuit 1 acts as an adder or subtracter.

An address generator 5 is connected, via amplifier A5, to the memory 2 address input Ea and, via a 2-way port, to the second 2-way port on the sequencer 6.

The fault correction method as described above is implemented as follows.

To acquire the fault correction frame, as discussed above, computing circuit 1 is programmed to add and the memory 2 is controlled by address generator 5, which outputs, in succession, the addresses of the various points in the even- and odd-parity frames. During image destructuring, the circuit 1 operates as an adder and, during this first step in the method, m, where m is a given integer, frames of the same parity are summed in memory 2 considering only one point of n in each line.

During the next step, which begins as soon as the summing of m frames has been completed, memory 2 is no longer controlled by the address generator but by the calculator which divides the total values in the memory by the number m of frames summed; the calculator then determines the minimum signal value in the memory; when it has found this value, it subtracts it from all other signals contained in the memory. At this instant, the correction frame in memory 2 includes correction signals for one of every n points per line only. The calculator completes this frame by calculating the signal for every other point in the correction frame; the signal for a given point in a given line is calculated by interpolating between the values of the correction signals for the two points on the given line for which, of all the points closest to the given point, correction signals are available in memory 2.

This completes acquisition of the correction frame and the camera can then be adjusted to observe the scene from which the destructuring values were acquired. Sequencer 6 then programmes the computing circuit 1 as a subtracter and the memory 2 is again controlled by the address generator. Correction is achieved by subtracting, from the video signal for a point in the frame, this video signal being applied to computing circuit 1 input A, the correction signal for this point contained in memory 2.

It should be noted that the address generator 5 is synchronized with the frame and line scan performed by the mirrors M6 and M7; this generator can therefore be used to allow for the camera operating mode (normal scan, partial scan, etc.) to scan the memory 2 in a way which ensures the video signal Vi is permanently synchronized with the corresponding correction signal read from memory 2.

This invention is not limited to the example described above; for example, in the case of the camera illustrated in FIG. 1, the image can be destructured by varying only the focus and the line of sight or even the focus alone.

In the same way, correction signals can be acquired not only for frames of one parity only but for frames of each parity to produce two separate correction frames, one for even-parity frames and one for odd-parity frames. It is also possible to acquire not only one point of every n per frame line but all points in the frame line. It is also possible not to acquire all lines in a frame but only one line of p, where p is an integer greater than 1, and then calculate the points in the missing lines by interpolation in the calculator using the points in the closest lines whose signal correction values are already known.

Moreover, the invented method is not only applicable to thermal cameras of the type described using FIGS. 1 and 2 but also to any camera with opto-mechanical scanning, whether it be a thermal camera or one operating in the visible or ultra-violet range.

What is claimed is:

1. A method of correcting, in a camera with a detector and opto-mechanical scanning, faults in the digital image of even- and odd-parity frames where the frames contain fixed points of the image arranged in lines and represented by digital values obtained by converting analog values output by the detector, comprising the steps of:

aiming the camera at a scene;

destructuring the image of the scene, for a given lapse of time, by making inconsistent changes to the camera settings including modifying the focus of the camera and modifying a direction of the camera line of sight;

acquiring, during the given lapse of time when the image of the scene is destructed, m, where m is a positive integer, frames with a same parity to calculate a mean frame in which each point within the mean frame has approximately the mean value of the digital values of corresponding points in the m frame;

memorizing a correction frame in which the value of each point corresponds to the value of corresponding points in the mean frame to within a given constant value;

adjusting the camera settings to correctly observe the scene; and subtracting, for each point in the correctly observed scene, the memorized value of the corresponding point from the correction frame.

2. A correction method as described in claim 1 in which the acquisition during the given lapse of time concerns one point of every n points, where n is an integer greater than 1, in each frame line and in which, in the mean frame, for points other than said one point of every n points, the mean value is calculated by interpolation from the mean values of the nearest said one point of every n points.

3. A method as described in claim 1 or 2, in which the given constant value is the lowest value, accompanied by the minus sign, among all the mean values of the points in the mean frame.

4. A method as described in claim 1, wherein said destructuring step further includes revolving the image by revolving a derotating mirror.

5. A method according to claim 1, wherein said step of destructuring the image of the scene modifies the direction of the camera line of sight by changing an elevation of the camera line of sight.

6. A method according to claim 1, wherein said steps of acquiring, memorizing, adjusting and subtracting are performed separately for odd parity frames and for even parity frames.

7. A method of correcting faults of an image detected by a camera, comprising the steps of:

aiming a camera at a scene along a line of sight;

destructing, during a predetermined time period, an image of the scene by defocusing the image and modifying a direction of the line of sight of the camera;

detecting a first image signal during the predetermined time period when the image of the scene is destructed;

determining compensation data using the first image signal;

focusing and aiming the camera at the scene;

detecting a second image signal when the camera is focused at the scene; and correcting the second image signal using the determined compensation data.

8. A method according to claim 7, wherein the step of destructuring the image also revolves a derotating mirror.

9. A method according to claim 7, wherein said step of destructuring the image of the scene modifies the direction of the camera line of sight by changing an elevation of the camera line of sight.

10. An apparatus for correcting faults of an image detected by a camera, comprising:

means for destructuring, during a predetermined time period, an image of the scene by defocusing the image and modifying a direction of a line of sight of the camera;

means for detecting a first image signal during the predetermined time period;

means for determining compensation data using the first image signal;

means for detecting a second image signal when the camera is focused at the scene; and means for correcting the second image signal using the determined compensation data.

11. An apparatus according to claim 10, wherein the means for destructuring the image further destructures the image by revolving a derotating mirror.

12. An apparatus for correcting faults of an image detected by a camera according to claim 10, wherein said means for destructuring modifies the direction of the line of sight of the camera by modifying an elevation of the line of sight of the camera.

* * * * *